(12) United States Patent
Zhu et al.

(10) Patent No.: US 11,205,941 B2
(45) Date of Patent: Dec. 21, 2021

(54) METHODS FOR TUNING MAGNETIC PROPERTIES OF ELECTRICAL STEEL CORES FOR ELECTRICAL DEVICES

(71) Applicant: FORD GLOBAL TECHNOLOGIES, LLC, Dearborn, MI (US)

(72) Inventors: Leyi Zhu, Novi, MI (US); Feng Liang, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/538,497

(22) Filed: Aug. 12, 2019

(65) Prior Publication Data

US 2019/0363618 A1 Nov. 28, 2019

Related U.S. Application Data

(62) Division of application No. 15/434,958, filed on Feb. 16, 2017, now abandoned.

(51) Int. Cl.
*H02K 15/00* (2006.01)
*H02K 15/02* (2006.01)

(52) U.S. Cl.
CPC ........ *H02K 15/02* (2013.01); *Y10T 29/49009* (2015.01)

(58) Field of Classification Search
CPC ........... Y10T 29/4902; Y10T 29/49009; Y10T 29/49078; Y10T 29/49069; H02K 15/02; H02K 1/26; H02K 1/2706
USPC ............... 29/596, 598, 602.1, 604, 609, 732
See application file for complete search history.

(56) References Cited

U.S. PATENT DOCUMENTS

| 3,438,229 | A | 4/1969 | Bartlett |
| 6,891,297 | B2 * | 5/2005 | Shimada ............... H02K 1/2766 310/152 |
| 2007/0108169 | A1 | 5/2007 | Shimada et al. |
| 2010/0154504 | A1 | 6/2010 | Cunha et al. |
| 2014/0084910 | A1 | 3/2014 | Makino |
| 2014/0283373 | A1 | 9/2014 | Melfi et al. |
| 2015/0372572 | A1 | 12/2015 | Hashimoto et al. |

* cited by examiner

*Primary Examiner* — Thiem D Phan
(74) *Attorney, Agent, or Firm* — David R. Kelley; Brooks Kushman P.C.

(57) ABSTRACT

Methods for tuning properties of electric machines are disclosed. A method for reducing core loss in an electric machine includes punching a plurality of laminations from one or more electrical steel sheets that results in one or more cut edges. The method further includes assembling the laminations into a core such that an outer perimeter surface of the core is defined by the cut edges. The method further includes peening the outer perimeter surface to remove residual stresses.

9 Claims, 10 Drawing Sheets

METHODS FOR TUNING MAGNETIC PROPERTIES OF ELECTRICAL STEEL CORES FOR ELECTRICAL DEVICES

CROSS-REFERENCE TO RELATED APPLICATIONS

This application is a division of U.S. application Ser. No. 15/434,958 filed Feb. 16, 2017, now abandoned, the disclosure of which is hereby incorporated in its entirety by reference herein.

TECHNICAL FIELD

This application generally relates to processing of electric devices including electric machine rotor and stator components to change magnetic properties.

BACKGROUND

Electrical machines and devices are utilized in electrified vehicles. The overall performance of the vehicle can be impacted by the operating characteristics of the electrical device. The electrical devices must be designed to satisfy various requirements including power and torque requirements that may be specific to each vehicle. Further, it may be desired optimize energy losses while satisfying the power and torque requirements.

SUMMARY

A method for reducing core loss in an electrical device core includes punching a plurality of laminations from one or more electrical steel sheets that results in one or more cut edges. The method further includes assembling the laminations into the electrical device core such that an outer perimeter surface of the core is defined by the cut edges. The method further includes peening the outer perimeter surface to remove residual stresses.

A method for forming a rotor lamination includes punching a plurality of openings in the rotor lamination to form magnet openings using a punch having a leading portion configured to punch through the rotor lamination and enter a die beneath the rotor lamination and a tapered portion configured to compress edges defining the magnet openings between the punch and the die when the leading portion penetrates the die to increase plastic deformation at the edges.

A method for tuning properties of an electrical device core includes punching a lamination from electrical steel such that the lamination has one or more cut edges defining an outer perimeter edge of the lamination. The method further includes masking the lamination to expose a surface immediately adjacent to the outer perimeter edge. The method further includes peening the outer perimeter edge of the lamination.

A method for decreasing magnetic permeability in an electrical device core includes punching a lamination for the electrical device core. The method further includes deforming the lamination in a mold to deform the lamination in one or more predefined regions of the lamination at which deformation results in a decrease in magnetic permeability of the electrical device core.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
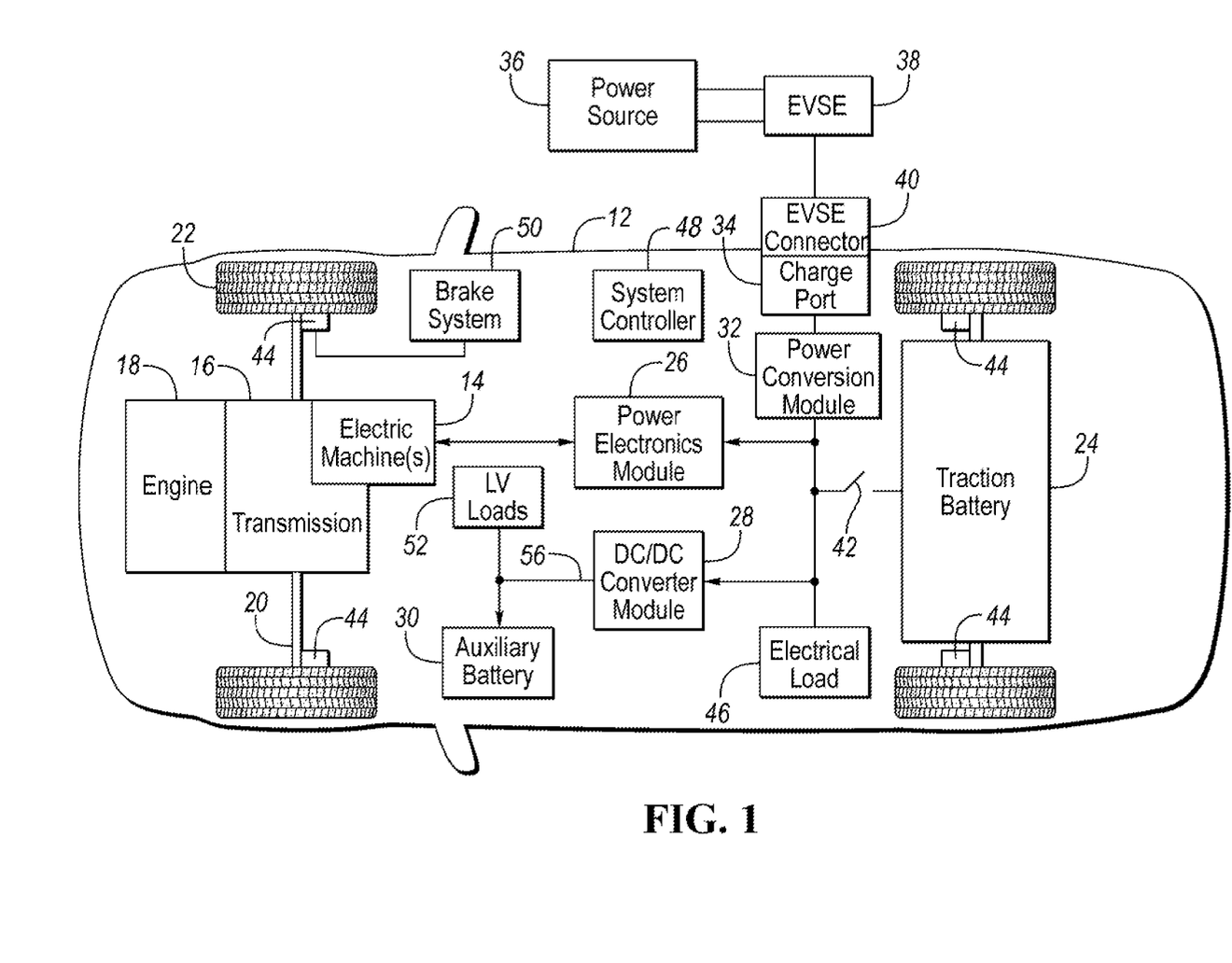
FIG. 1 is a diagram of a hybrid vehicle illustrating typical drive train and enemy storage components including an electric machine.

FIG. 1 depicts a plug-in hybrid-electric vehicle (PHEV). A PHEV 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. One or more contactors 42 may isolate the traction battery 24 from a high-voltage bus when opened and couple the traction battery 24 to the high-voltage bus when closed. The traction battery 24 is electrically coupled to one or more power electronics modules 26 via the high-voltage bus. The power electronics module 26 is also electrically coupled to the electric machines 14 and provides the ability to hi-directionally transfer energy between high-voltage bus and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that is electrically coupled to the high-voltage bus. The DC/DC converter module 28 may be electrically coupled to a low-voltage bus 56. The DC/DC converter module 28 may convert the high voltage DC output of the traction battery 24 to a low voltage DC supply that is compatible with low-voltage vehicle loads 52. The low-voltage bus 56 may be electrically coupled to an auxiliary battery 30 (e.g., 12V battery). The low-voltage systems 52 may be electrically coupled to the low-voltage bus 56.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands via a brake pedal and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. The high-voltage loads 46 may include compressors and electric heaters.

Electronic modules in the vehicle 12 may communicate via one or more vehicle networks. The vehicle network may include a plurality of Channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2A:
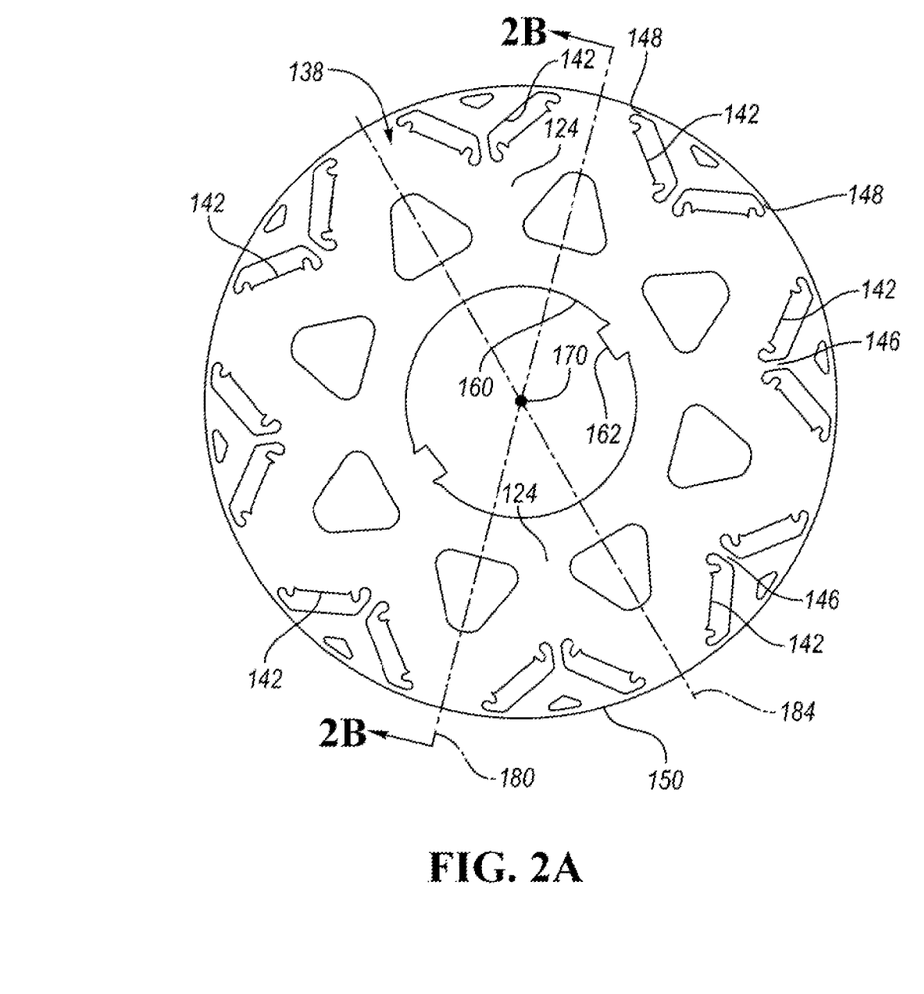
FIG. 2A is an example of a top view of a rotor lamination.
Figure 2B:
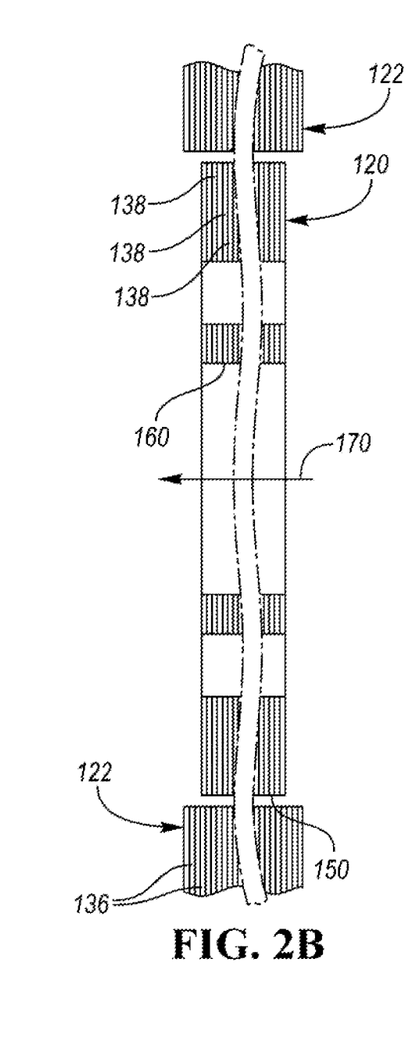
FIG. 2B is an example of a side view of a rotor constructed of a series of rotor laminations.

The electric machines 14 may be Interior Permanent Magnet (IPM) machines that include a stator core 122 and a rotor core 120. FIG. 2A depicts an example rotor lamination 138 and FIG. 2B depicts a side view of a stator core 122 and a rotor core 120 configuration having multiple rotor laminations 138 and multiple stator laminations 136 arranged in an axially stacked relationship. The rotor laminations 138 and the stator laminations 136 may be coated with an insulating coating to aid in preventing induced currents from flowing between laminations. The rotor laminations 138 may define a circular central opening 160 for accommodating a drive shaft with a keyway that may receive a drive key 162. The rotor laminations 138 may define a plurality of magnet openings 142 that are symmetrically disposed with respect to adjacent pairs of magnet openings 142. The magnet openings 142 may be grouped in pairs with each of the pairs thrilling a V-shape.

A plurality of rotor sectors 124 corresponding to poles of the rotor may be defined by a plurality of inter-polar axes (e.g., 180, 184) emanating from a central axis 170 of rotation to an outer surface 150 of the rotor lamination 138. Each of the sectors 124 may include a pair of magnet openings 142. The pairs of magnet openings may define a V-shape. In addition, a bridge region 146 may be defined at a base of the pair of magnet openings 142. The bridge region 146 may be the surface area between the openings that form the V-shape for each of the pairs. The bridge region 146 may be defined as the surface at the base of the V-shape at which the associated magnet openings 142 that form the pair are at a closest distance to one another. The bridge region 146 may also be defined as the surface area between where the associated magnet openings 142 almost touch. Outer bridge regions 148 may be defined as the surface area between the outer surface 150 and distal ends (from the base) of the magnet openings 142. The inter-polar axes (e.g., 180, 184) may be positioned to be midway between adjacent magnet openings 142. Note that FIG. 2A only shows two of the possible inter-polar axes 180, 184 and does not show all possible inter-polar axes. FIG. 2B depicts a series of axially stacked rotor laminations 138 that are stacked along the central axis 170 about which the rotor core 120 is configured to rotate.

Figure 3:
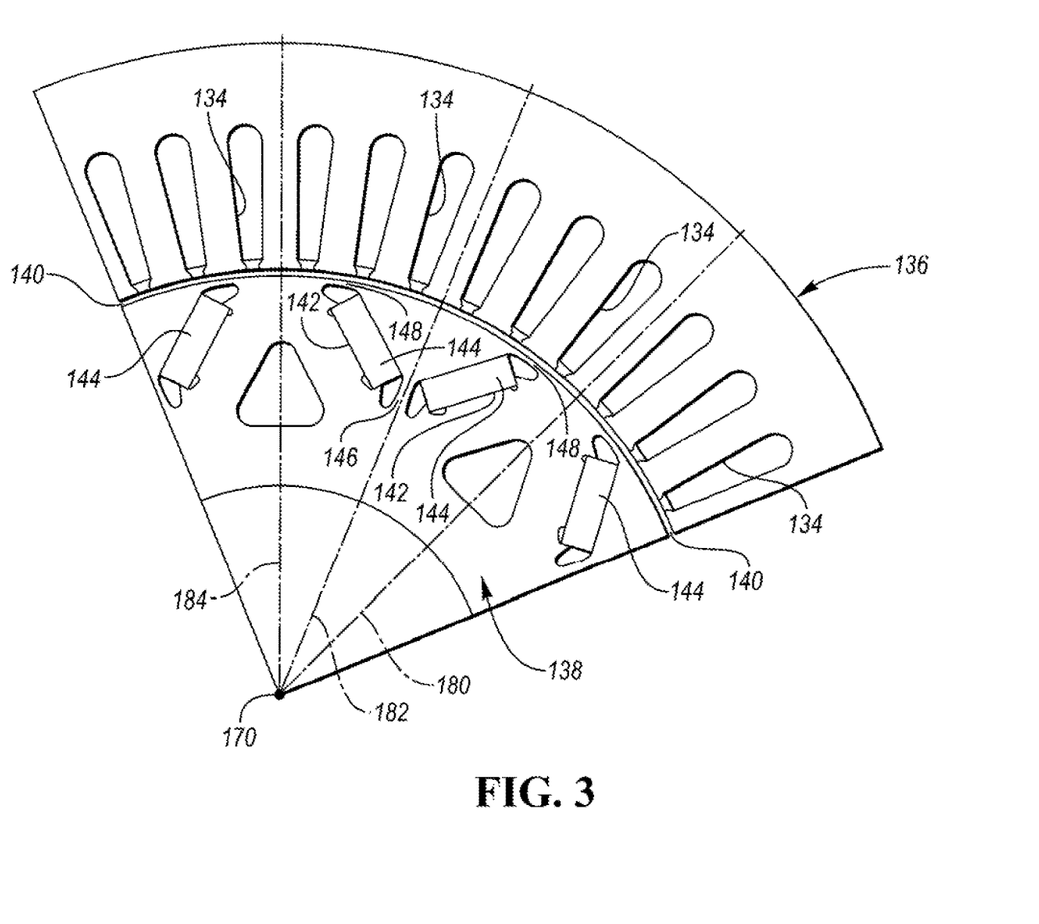
FIG. 3 is an example of a partial rotor and stator lamination.

FIG. 3 depicts a partial radial cross-sectional view of a possible construction of the rotor core 120 and the stator core 122. A partial stator lamination 136 and a partial rotor lamination 138 are depicted in FIG. 3. The rotor laminations 138 and the stator laminations 136 may be comprised of a ferrous alloy. A small air gap 140 is located between the inner periphery of the stator laminations 136 and the outer periphery 150 of the rotor laminations 138. The stator laminations 136 may define radially extending openings 134 forming teeth about an inner circumference of the stator core 122.

The rotor laminations 138 may define symmetrically positioned magnet openings 142 near the outer periphery 150 of each rotor lamination 138. Each magnet opening 142 may be configured to receive a magnet 144. Any number of laminations in a given design may be used, depending on design choice. The rotor laminations 138 and the stator laminations 136 may be arranged in a stack along the axis 170 of rotation. The axially stacked rotor laminations 138 and the magnets 144 may define a plurality of magnetic poles distributed about the axis 170.

The stator core 122 may include conductors disposed in the radially extending openings 134 to form windings. The stator core 122 may be comprised of an iron core made of a stack of stator laminations 136 and a winding arrangement for conductors that carry an excitation current. Current flowing through the stator windings generates a stator electromagnetic flux. The stator flux may be controlled by adjusting the magnitude and frequency of the current flowing through the stator windings.

The rotor core 120 may be comprised of an iron-based core comprised of a stack of rotor laminations 138 and sets of permanent magnets 144 inserted within holes or cavities 142 that are defined by the iron core. The permanent magnets 144 in the rotor core 120 may generate a rotor electromagnetic flux. The rotor flux may include harmonic fluxes due to shapes and sizes of the discrete permanent magnets. The stator flux and the rotor flux may be distributed in the air-gap 140. Interaction between the stator flux and the rotor flux causes the rotor core 120 to rotate about the axis 170.

Poles of the rotor core 120 may be geometrically defined to correspond to the sectors 124 defined by the rotor laminations 138. Each of the poles may be represented by a sector 124. A pole location may be generally defined by a center-pole axis 182 that extends radially from the axis 170 toward the outer surface 150 of the rotor 138 along a midpoint between adjacent magnet openings 142. The inter-polar axes (e.g., 180, 184) may extend radially from the axis 170 toward the outer surface 150 of the rotor lamination 138 between adjacent poles. An angular distance between two adjacent poles may define a pole pitch parameter. The arc length on the circumferential rotor surface 150 between two adjacent poles of the rotor may be referred to as the pole pitch. The pole pitch may be measured circumferentially around the outer rotor surface 150 between adjacent center-pole axes 182. Each pole may have an associated surface area on the outer perimeter surface 150 of the rotor core 120. Each pole may be represented by the arc length on the surface between adjacent inter-polar axes 180, 184.

Electrical steel is used in electrical applications to construct electrical devices such as power transformers, distribution transformers, and electric machines (motors and generators). Electrical steel may include a range of iron alloys that have favorable magnetic properties for electric machine construction. Iron alloys suitable for electrical steel may include a percentage of silicon. Electrical steel is typically formed into sheets that may be cut or punched to form laminations. During usage, cyclic variation of the applied magnetic field dissipates energy in the electrical steel which is referred to as core loss. Improvements in device efficiency may be achieved by reducing the core loss in the electrical steel.

Electrical devices (e.g., electric machine 14) may be constructed of stacks of electrical steel sheets. Electrical devices may include electric machines, transformers, inductors, and other devices that are comprised of a laminated core. The electrical steel sheets may be cut to a finished shape by a punch and die. For example, rotor laminations 138 and stator laminations 136 may be formed by punching or cutting the desired shape from sheets of electrical steel. The finished shapes may be stacked and laminated together to form a core (e.g., stator core 122, rotor core 120). The punching process involves strong shearing forces at the cutting edge of the shapes and as a result plastic deformation exists in these regions. Plastic deformation or strain affects the magnetic properties of the core. In particular, core losses increase which affects the performance of the electrical device.

Various techniques may be used to remove the residual stresses induced by the cutting process. For example, stress relief annealing (SRA) may be used. SRA involves heat treating the punched electrical sheet or assembled core at elevated temperatures for an extended period of time. A vacuum or protective gas environment is required during SRA to prevent oxidation of the electrical steel. Although SRA is effective in reducing residual stress and core loss, it is less attractive for practical applications due to the high energy cost in heating, the large extra capital investment in a controlled atmosphere annealing furnace, the long processing time for heating, soaking and cooling of the core, and the deformation of the core daring heating and cooling.

In addition, past processing techniques lead to the laminations having homogeneous properties. However, to improve electrical device performance, local regions of the laminations may be processed to achieve different properties in those local regions. Such processing can improve overall electrical device performance by tuning the properties of the electrical device. For example, it is preferred for some regions of an electrical device core to have a low magnetic permeability to reduce flux leakage and increase torque density or the electrical device. For other regions of the electrical device core it may be preferred to have a high magnetic permeability to assure a large magnetic induction for high torque density. Such affects may be achieved by localized processing of the laminations and/or the electrical device core.

A method for processing electrical steel may include the following steps. The electrical steel may be punched into a finished shape. The finished shape may be a lamination for an electrical device core. For example, the finished shape may be a rotor lamination 138 or a stator lamination 136 for an electric machine 14. The finished shape may be a transformer core lamination. The individual laminations may be stacked and laminated to produce a core (e.g., rotor core 120, stator core 122, transformer core). The assembled cores may be treated at the cut edges by peening processes that mechanically reduce the residual stress at the cut edges. The peening processes may include shot peening, laser peening, cavitation peening and wet shot peening. Peening and other mechanical stress removal processes including mechanical vibration, burnishing, sandblasting, ballising, vibratory stress relief technology, and other methods of work hardening electrical steel materials may be used.

Figure 4:
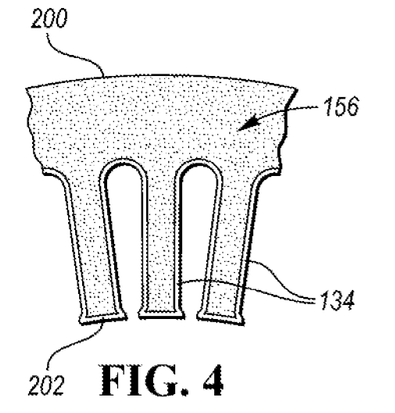
FIG. 4 is a portion of a stator lamination.

FIG. 4 depicts a portion of the stator lamination 136. As discussed previously, the stator laminations 136 may define radially extending openings 134 forming teeth. The teeth may define, at a stator lamination inner perimeter surface 202 of the stator lamination 136, openings or slots along the stator lamination inner perimeter surface 202. Further, the stator lamination 136 may also define a stator lamination outer perimeter surface 200.

Figure 5:
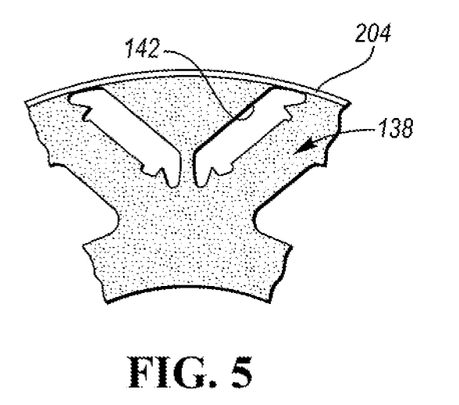
FIG. 5 is a portion of a rotor lamination.

FIG. 5 depicts a portion of the rotor lamination 138. The rotor laminations 138 may define a rotor lamination outer perimeter surface 204 that extends around the periphery of the rotor lamination 138.

Figures 6, 7:
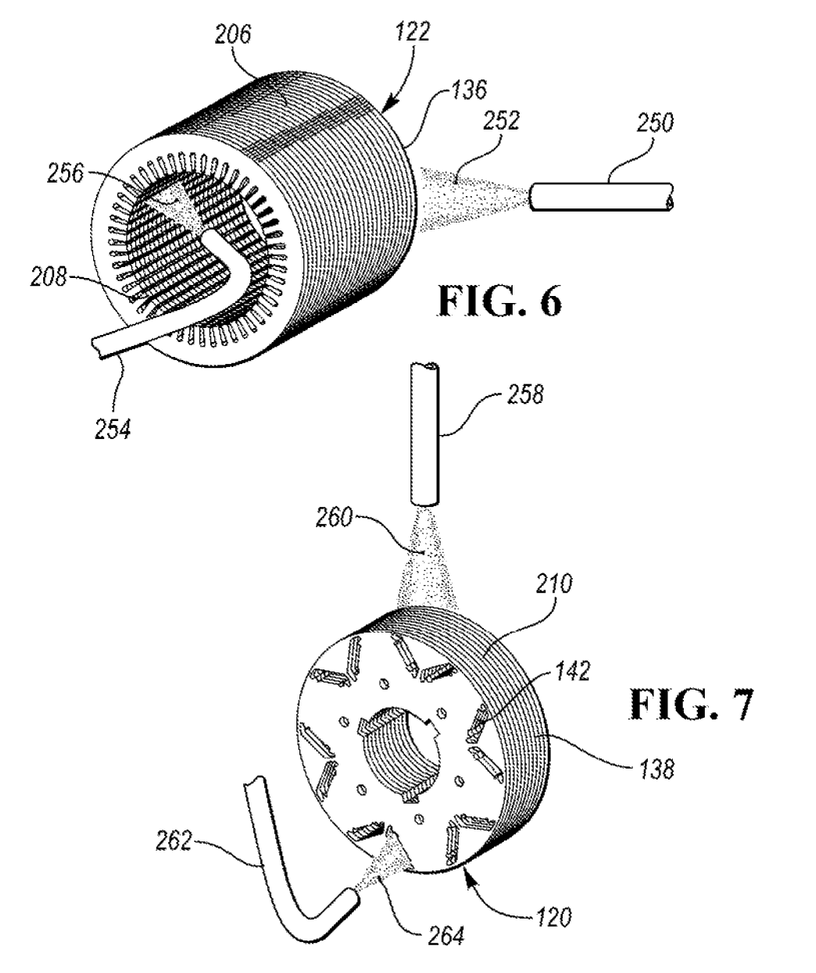
FIG. 6 depicts an example of peening surfaces of a stator core.
FIG. 7 depicts an example of peening surfaces of a rotor core.

FIG. 6 depicts the assembled stator core 122 that is formed from the stator laminations 136. A stator outer perimeter surface 206 may include the stator lamination outer perimeter surface 200 of each of the stator laminations 136. The stator outer perimeter surface 206 may be cylindrically shaped. A stator inner perimeter surface 208 may include the stator lamination inner perimeter surface 202 of each of the stator laminations 136. The stator inner perimeter surface 208 may by generally cylindrical in shape with axial openings or slots defined by the teeth along the surface. The stator inner perimeter surface 208 may include the surface of the stator lamination 136 that is adjacent to the defined openings.

FIG. 6 also depicts one technique for peening the surfaces of the stator core 122. One method of peening the surface is shot peening. Shot peening is a technique in which small particles are impacted with a surface. The small particles may be spherical particles composed of metal, glass and/or ceramic material. The particles may be propelled by air. Each particle acts as a small peening hammer producing small indentations on the surface. For example, pressurized air may accelerate the particles through a nozzle 250 to form a particle stream 252. The particle stream 252 may impact the stator outer perimeter surface 206. The impacts of the particles cause plastic deformation in the stator outer perimeter surface 206. The bombardment with the spherical media induces residual compressive stress into the stator core surfaces. The compressive plastic deformation caused by peening removes tensile residual stress caused by cutting or punching, and also work-hardens the laminations to increase mechanical strength. The peening media may be chosen based on the mechanical properties and thickness of the lamination. Peening parameters such as intensity, exposure time, air pressure, impact angle, and nozzle characteristics may be chosen to optimize the process and maximize core loss reduction. For peening the entire stator outer perimeter surface 206, the nozzle 250 may be moved in a controlled manner to move axially and rotationally about the stator core 122. Alternatively, the stator core 122 may be moved relative to the nozzle 250 in order to cause the particle stream 252 to impact the entire stator outer perimeter surface 206. In other configurations, multiple nozzles may be used to treat the stator core.

In a similar manner, pressurized air may accelerate particles through a curved nozzle 254 to form a second particle stream 256 that impacts the stator inner perimeter surface 208. For peening the entire stator inner perimeter surface 208, the nozzle 254 may be moved in a controlled manner to move axially and rotationally within an opening defined by the stator core 122. Alternatively, the stator core 122 may be moved relative to the nozzle 254 in order to cause the particle stream 256 to impact the entire stator inner perimeter surface 208. The orifice of the curved nozzle 254 may be selected such that particle stream 256 can pass into the opening defined by the teeth. In addition, the curved nozzle 254 may be angled axially with respect to the stator inner perimeter surface 208 to prevent particle build-up in the openings defined by the teeth. In addition, airflow may be provided axially within the openings defined by the teeth to prevent the particles from accumulating in these spaces.

FIG. 7 depicts the assembled rotor core 120 that is assembled from the rotor laminations 138. A rotor outer perimeter surface 210 may include the rotor lamination outer perimeter surface 204 of each of the rotor laminations 138. The rotor outer perimeter surface 210 may be cylindrically shaped. In a similar manner as described in relation to the stator core 122, a nozzle 258 may direct a stream of particles 260 toward the rotor outer perimeter surface 210. For peening the entire rotor outer perimeter surface 210, the nozzle 258 may be moved in a controlled manner to move axially and rotationally about the rotor core 120. Alternatively, the rotor core 120 may be moved relative to the nozzle 258 in order to cause the particle stream 260 to impact the entire rotor outer perimeter surface 210.

The surface that is defined within the magnet openings 142 may also be peened. For example, a second nozzle 262 may be configured to direct a particle stream 264 into the magnet openings 142 to peen the surfaces defined within the magnet openings 142. The second nozzle 262 may be moved and rotated within the opening defined by the magnet openings 142 to peen the entire surface. The peening process may be configured with a plurality of similar nozzles to peen each of the magnet openings 142 simultaneously. In other configurations, the second nozzle 262 may be moved between magnet openings 142 or the rotor core 120 may be rotated to position a magnet opening 142 in the proper position.

FIG. 6 and FIG. 7 depict examples of processing an assembled core as applied to a rotor and a stator for an electric machine. In other applications, the peening procedure may be applied to all surfaces that are comprised of cut edges of the laminations. This may include outer perimeter surfaces, inner perimeter surfaces, and any surfaces defined by openings or slots within the core.

Figures 8, 9:
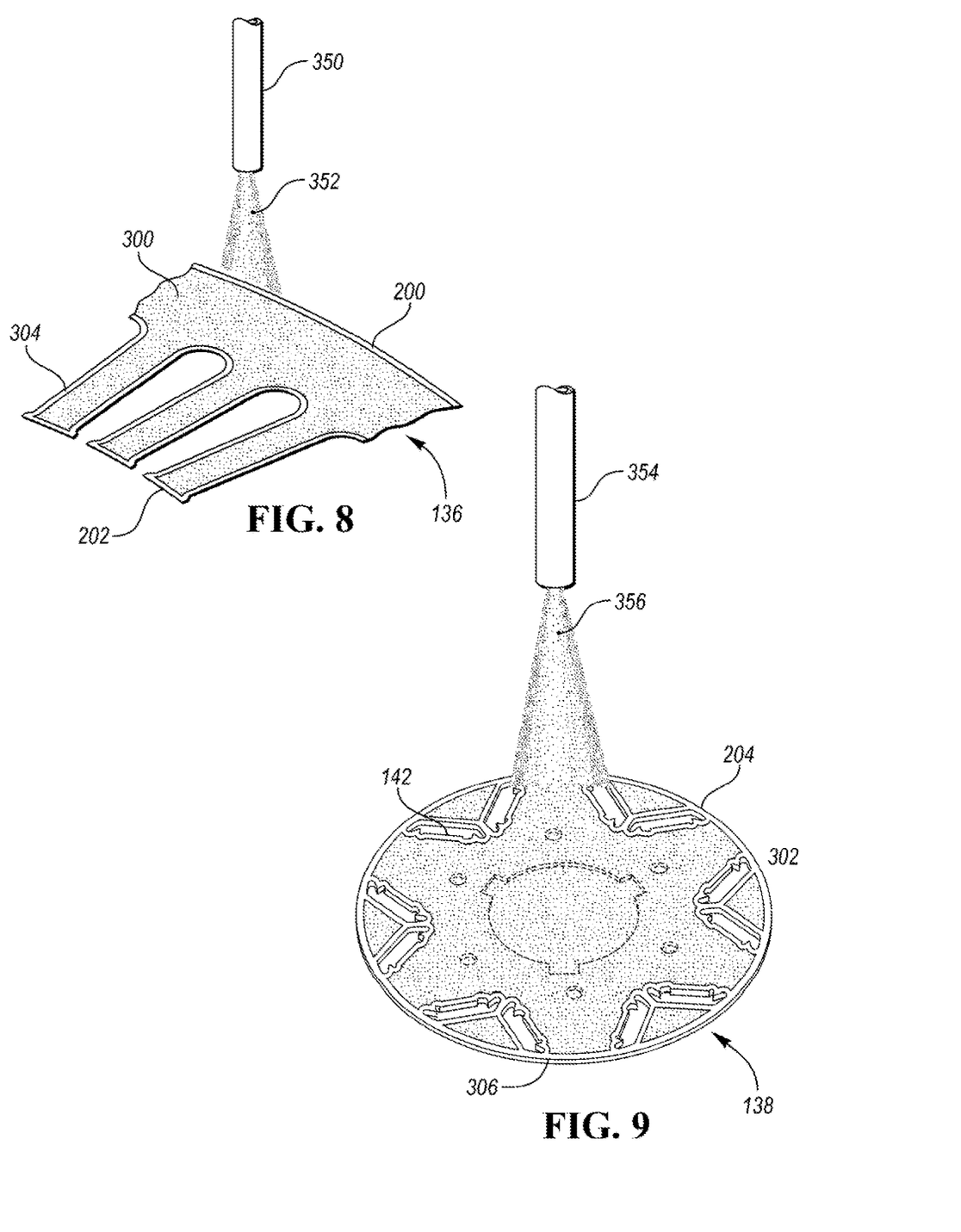
FIG. 8 depicts an example of peening surfaces of a stator lamination.
FIG. 9 depicts an example of peening surfaces of a rotor lamination.

FIG. 6 and FIG. 7 depict the process in which the assembled stator core 122 and rotor core 120 are peened. Alternatively, each lamination may be treated before assembly. FIG. 8 depicts an example in which the stator lamination 136 is peened prior to assembly into the stator core 122. A stator mask 300 may be placed between the stator lamination 136 and a nozzle 350. The mask may allow peening of only the cut edges of the stator lamination 136. In this case, the cut edges may include the stator lamination outer perimeter surface 200 and the stator lamination inner perimeter surface 202. The stator mask 300 may expose a stator edge surface 304 on a face of the stator lamination 136 that is adjacent to the stator lamination outer perimeter surface 200 and the stator lamination inner perimeter surface 202. The stator lamination inner perimeter surface 202 may include the edges of the teeth that define the slots.

The mask may be configured such that only the stator edge surface 304 is impacted by the particle stream 352. The nozzle 350 may be moved in order to cause the particle stream to impact the entire stator edge surface 304. Note that the stator laminations 136 have two face surfaces that may be treated. The stator lamination 136 may be rotated to expose the opposite face and the shot peening may be repeated. Alternatively, both faces of the stator laminations 136 may be treated by addition of a second nozzle and a second mask on the side of the other face.

FIG. 9 depicts an example in which the rotor lamination 138 is peened prior to assembly into the rotor core 120. A rotor mask 302 may be placed on a face of the rotor lamination 138. The mask may allow peening of only the cut edge of the rotor lamination 138. The cut edge of the rotor may include the rotor lamination outer perimeter surface 204. The rotor mask 302 may expose a rotor edge surface 306 on the face of the rotor lamination 138 that is adjacent to the rotor lamination outer perimeter surface 204. The nozzle 354 may direct a stream of particles 356 at the rotor lamination 138 and rotor mask 302. The rotor mask 302 prevents the particle stream 356 from impacting portions of the rotor lamination 138 that lie between the rotor mask 302 and the nozzle 354. The particle stream 356 may impact the rotor edge surface 306 to induce plastic deformation in this region of the rotor lamination 138. The mask may be constructed of a hardened material that does not transfer the impacts to the underlying material. The mask 302 may also be configured to expose the edge surfaces that surround each of the magnet openings 142.

The above examples depict a mask applied to rotor and stator laminations. This processing may be applied to laminations for any electrical device. Further, the mask may be configured to expose predefined regions of the underlying lamination. The predefined regions may be selected based on an analysis of properties of the electrical core. For example, the predefined region may be a region in which, when peened, results in reduced core losses in the electrical device.

Figure 10:
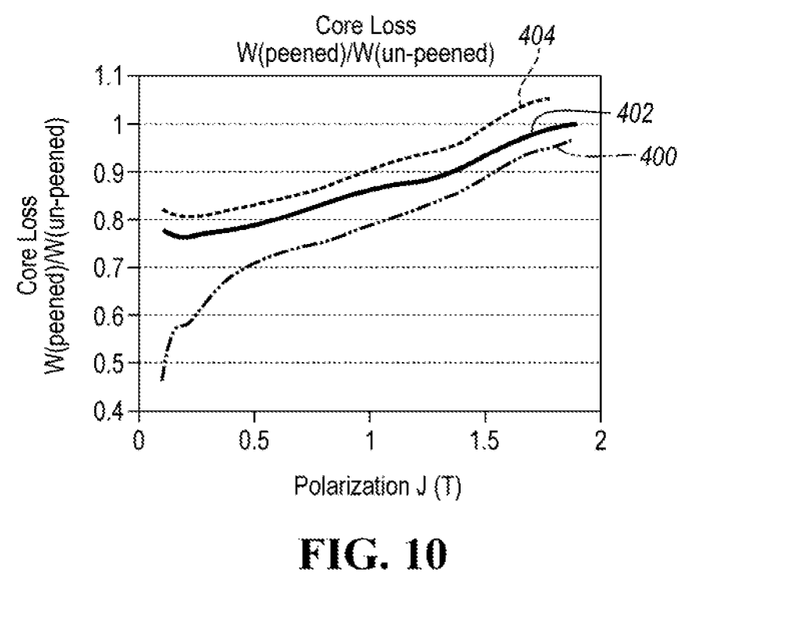
FIG. 10 is a plot of core losses as a function of polarization for a baseline electric machine and a peened electric machine configured to reduce core losses.

FIG. 10 depicts plots of the relative core loss as a function of polarization for an electric machine core in which the outer and inner perimeter surfaces are peened as described previously. The polarization represents the intensity of magnetization of the material and is expressed in units of Teslas. After peening the side edges of the electrical steel core, the test data shows a significant core loss reduction. The relative core loss is the ratio of the core loss of the peened core to the core loss of the core before peening in the manner described above. The core loss is depicted at several frequencies. A first curve 400 results from operating the electric machine at a frequency of 50 Hz. A second curve 402 results from operating the electric machine at a frequency of 400 Hz. A third curve 404 results from operating the electric machine at a frequency of 1000 Hz. Note that at most polarizations, the relative core loss is less than one which indicates that the processed core has lower core loss than the unprocessed core.

Figure 11:
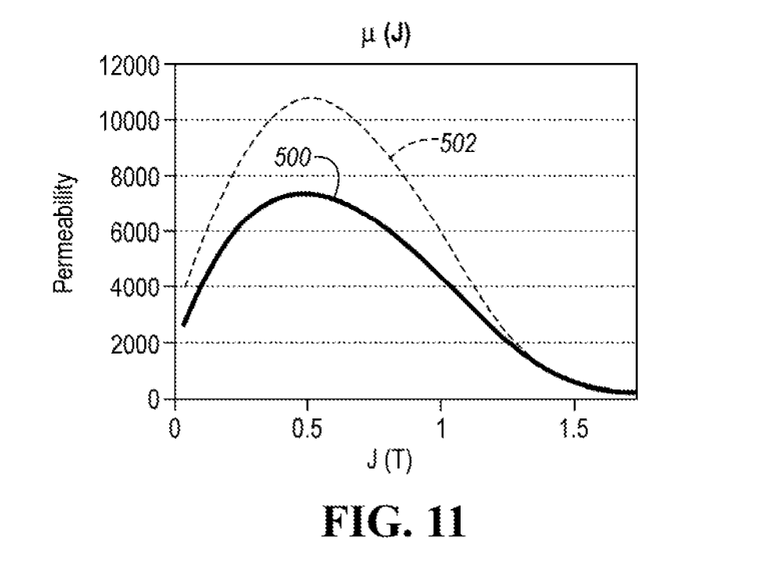
FIG. 11 is a plot of permeability as a function of polarization for a baseline electric machine and a peened electric machine configured to reduce core losses.

FIG. 11 depicts the magnetic permeability of the peened electric machine core and the electric machine core before peening as a function of polarization. The electric machine is processed as described previously to reduce core losses. Note that the magnetic permeability of the peened electric machine core increases compared to the reference sample. The magnetic properties of the electrical steel are changed after peening the cut edges of the electric machine core. A first permeability curve 500 represents the magnetic permeability of the reference electric machine core that is not peened. A second permeability curve 502 represents the magnetic permeability of the peened core. Testing indicates that peening the cut edges of the electric machine core causes an overall increased magnetic permeability for the core. Further benefits are achieved as the peening (e.g., shot peening) is a room temperature process with high-throughput and is more cost-effective than the conventional SRA technique.

A method for reducing core losses in an electrical device core may be implemented as described. The method may include punching laminations from one or more electrical steel sheets that results in one or more cut edges in the laminations. The lamination may be assembled into a core such that an outer perimeter surface of the core is defined by the cut edges. The outer perimeter surface of the core may be peened to remove residual stresses by any of the techniques described above. Such treatment may apply to both a rotor core 120 and a stator core 122. Additional processing may be applied to the stator core 122. For example, an inner perimeter surface that is further defined by the cut edges may be peened. The inner perimeter surface may define a plurality of slots running axially in the inner perimeter surface and the peening may be performed on the defined slots. The peening may be performed by methods including shot peening, laser peening, cavitation peening and wet shot peening.

Other methods may be implemented that treat the laminations in a similar manner prior to assembling the core. Such methods may include punching laminations from one or more electrical steel sheets that results in one or more cut edges in the laminations. A mask may be placed over the lamination to expose predetermined surfaces of the lamination. For example, the mask may expose a surface immediately adjacent to the outer perimeter edge. The predetermined surface that is exposed by the mask may be peened by the techniques described. For the stator laminations 136, the mask may farther expose edges of teeth defined in an inner perimeter edge by the cut edges. Peening may be performed on the edges of the teeth and the inner perimeter edge. A mask may be applied to an opposite face of the lamination and the peening may be performed on the opposite face (e.g., lamination has a top face and a bottom face). The lamination may then be assembled into a core.

The above described methods are directed toward reducing core loss in an electric machine. For some applications, the electrical device core may be processed to reduce magnetic permeability of the device. Plastic deformation changes the magnetic properties of the electrical device. For example, magnetic permeability decreases in the presence of plastic deformation of the lamination. In particular, plastic deformation may be introduced by deforming the laminations in predetermined locations to decrease magnetic permeability in selected areas of the laminations.

As above, the laminations may be formed from sheets of electrical steel. The electrical steel sheets may be of a predetermined thickness. The electrical steel sheets may be punched to create rotor laminations 138 and stator laminations 136. The laminations may be derived from one or more of the electrical steel sheets. Certain areas of the laminations that are configured to serve as flux barriers may be processed to suppress magnetic permeability. To reduce the magnetic permeability of a certain area, plastic deformation is introduced at these areas. The plastic deformation may be introduced by deforming processes.

Figure 12:
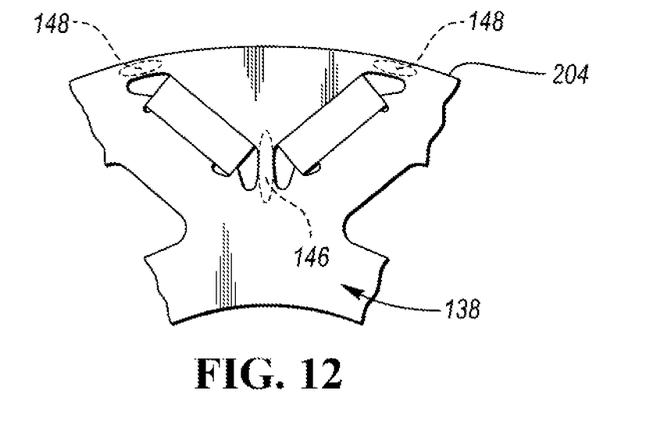
FIG. 12 is a portion of a rotor lamination depicting examples of areas to be deformed.

FIG. 12 depicts a portion of the rotor lamination 138 depicting example regions that may be deformed to reduce magnetic permeability. The bridge region 146 may be defined as the surface area between the magnet openings 142 that make up a V-shaped pair. As described earlier, the bridge region 146 is that region of electrical steel at the base of the V-shape at which point the magnet openings 142 associated with a pair are at a closest distance. In addition, outer bridge regions 148 may be defined as the surface of the lamination that lies between the distal ends of the magnet openings 142 and the outer perimeter surface 204. As depicted, there are two outer bridge regions 148 for each V-shaped pair of magnet openings 142.

To achieve a reduction in magnetic permeability, predefined regions may be deformed by the methods to be described. The predefined regions may be determined by analysis of the desired electrical device properties. For example, for a rotor lamination, the predefined regions may include the bridge region 146 and the outer bridge regions 148. The bridge region 146 and the outer bridge regions 148 may be locally treated by the peening methods previously discussed including shot peening and laser peening. A mask may be created and placed over the lamination to expose only the bridge region 146 and/or the outer bridge regions 148 for deforming. Such processing only changes the properties of the material in the exposed region. Note that other predefined regions may be selected based on the desired properties for a given electrical device. The predefined regions may be those surface areas of the lamination at which deformation results in a decrease in magnetic permeability of the electrical core.

Figure 13:
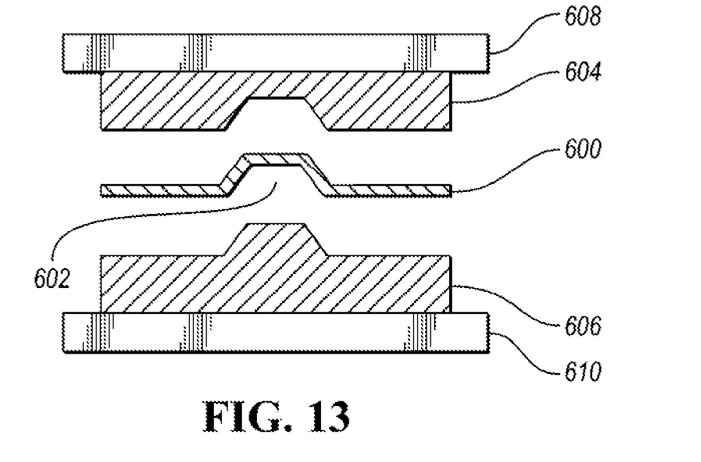
FIG. 13 depicts a press and mold for creating indentations in a lamination.

Another method of deforming the laminations may be to press the predetermined regions to form one or more indentations in the predetermined regions (e.g., bridge region 146 and outer bridge regions 148). FIG. 13 depicts an example of a portion of a mold configured to form one or more indentations in an electrical steel sheet press machine may be configured with an upper mold 604 and a lower mold 606. The upper mold 604 may be secured to an upper press member 608. The lower mold 606 may be secured to a lower press member 610. The upper mold 604 and the lower mold 606 may be configured to cooperate to form an indentation or a plurality of indentations in a lamination 600 that is placed in between. The upper press member 608 and the lower press member 610 may be configured to move relative to one another. The lamination 600 may be positioned in the mold and the upper press member 608 and the lower press member 610. Pressure may be applied to the upper press member 608 and/or the lower press member 610. The pressure forces the upper mold 604 and the lower mold 606 to move together resulting in an indentation 602 being formed in the lamination 600. The size, shape, and depth of the indentations may be configured to optimize the reduction of magnetic permeability for each electric machine design. Other shaped indentations are possible. For example, the mold may have a wave-shaped cross section. The indentations may be configured to have rounded edges, square/rectangular edges, or conical shape depending on the specific characteristics desired.

The pressing operation may be performed after the lamination 600 is punched. Further, the pressing operation may be incorporated with the punching operation. The punch and die may be configured to punch the openings of the lamination and, during the same operation, form indentations in the predetermined regions. The mold may be configured to form indentations at the predetermined locations of the lamination 600. For example, a predetermined pattern of indentations may be formed in the bridge region 146 and/or the outer bridge regions 148. The pattern may be selected to tune the magnetic permeability of the region to a predetermined value.

Figure 14:
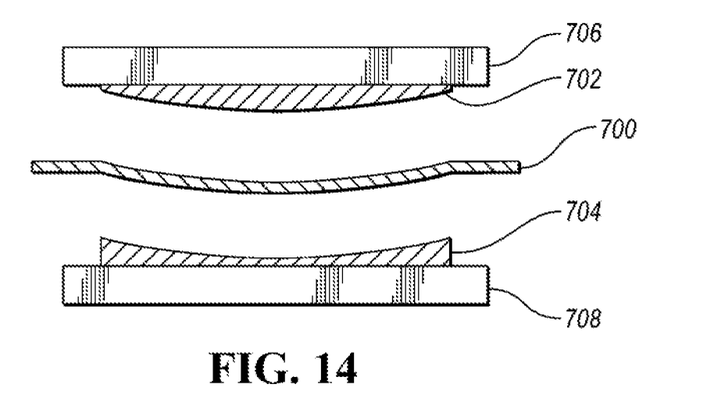
FIG. 14 depicts a press and mold for creating a curved cross-sectional profile in areas of a lamination.

FIG. 14 depicts another example of a portion of a mold configured to deform the lamination in the predetermined regions. The press machine may be configured with a first mold 702 secured to an upper press member 706 and a second mold 704 secured to a lower press member 708. Pressing the lamination may produce plastic deformation through the whole of the predetermined regions. A lamination 700 may be inserted between the first mold 702 and the second mold 704 and pressed. The resulting lamination may form a curved cross-sectional profile in those predetermined regions. The shape and curvature may be adjusted to modify the magnetic permeability in the predetermined regions.

Figure 20:
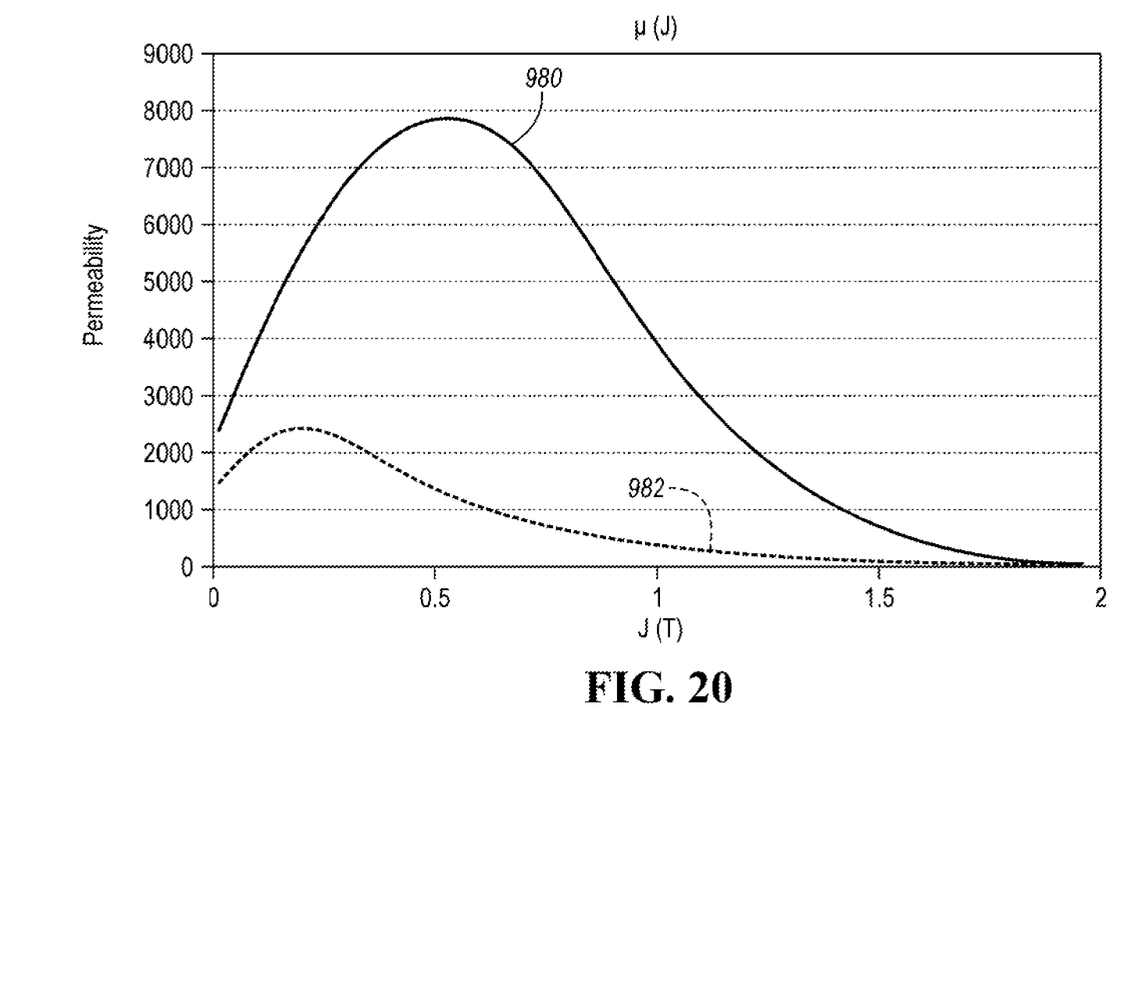
FIG. 20 depicts a plot of permeability for a baseline electric machine and an electric machine with deformed regions configured to reduce magnetic permeability.

FIG. 20 depicts an example of the change in magnetic permeability for an electric machine. A baseline curve 980 depicts the permeability of the electric machine without any processing. An after-deformation curve 982 depicts the permeability of the electric machine constructed of rotor laminations having indentations. Note that the magnetic permeability of the deformed components shows a reduction in magnetic permeability.

Figure 15:
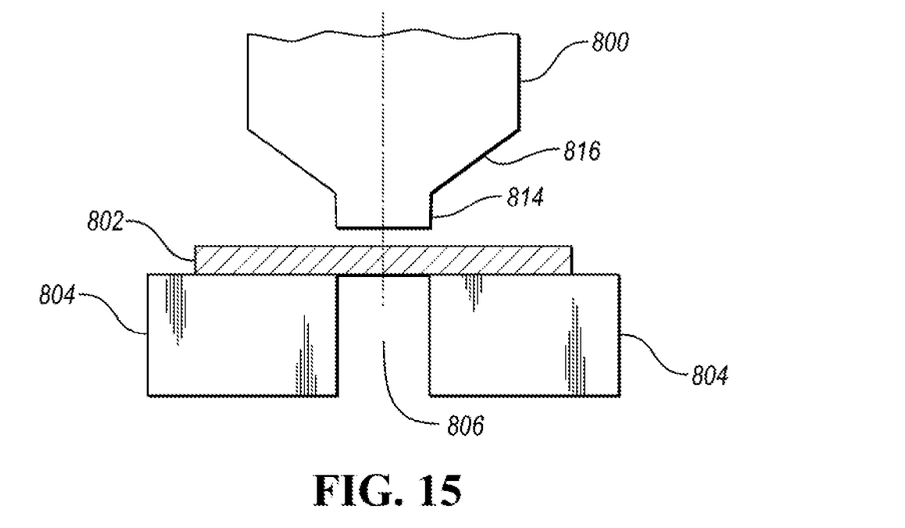
FIG. 15 depicts a punch and die for creating an opening in a lamination prior to operating the punch.

Plastic deformation may be introduced by the punching process. The conventional punching process applies a shearing force that creates plastic deformation at the cut edge. Additional plastic deformation can be achieved during the punching process. FIG. 15 depicts a punch 800 and die 804 for punching a lamination 802 in a position prior to punching. The die 804 may define an opening 806 that is configured to receive an end of the punch 800 and expel the punched material. The punch 800 may have a leading portion 814 that is configured to punch through the lamination 802 and enter the die 804 beneath the lamination 802. The punch 800 may have a tapered portion 816 that is configured to compress the lamination 802 when the leading portion 814 penetrates the die 804.

Figure 16:
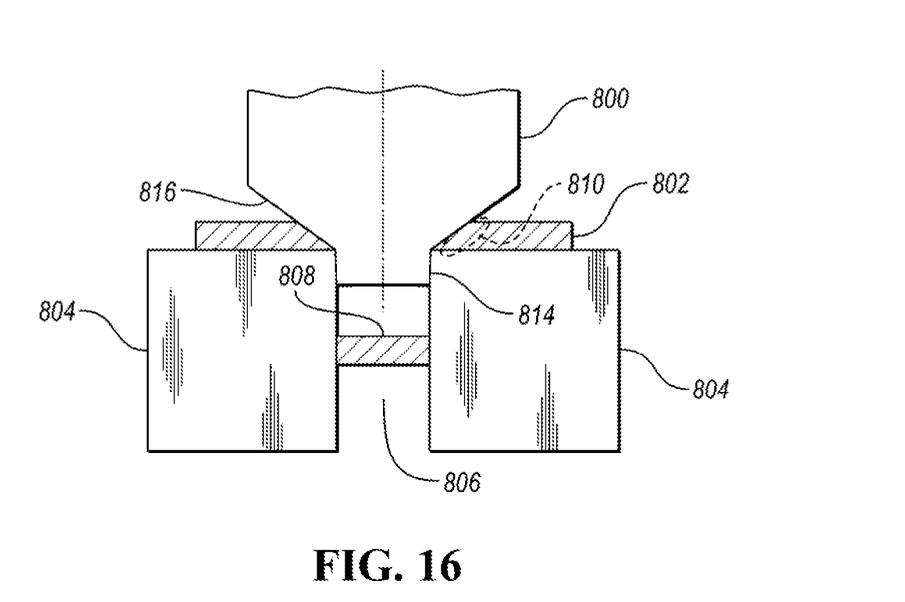
FIG. 16 depicts a punch and die for creating an opening in a lamination when the punch is deployed.

FIG. 16 depicts the punch 800 and die 804 in a position during the punching operation. The leading portion 814 penetrates the die 804 via the opening 806 defined by the die 804. The operation of the punch 800 and die 804 causes material 808 to be removed from the lamination 802 and expelled via the die opening 806. As the leading portion 814 penetrates the die 804 via the die opening 806, the tapered portion 816 further compresses the edges of the openings created in the lamination 802. The additional compression causes plastic deformation in the edges that define the opening in the lamination 802. The tapered portion 816 may be configured to apply an equal amount of force to the entire edge of the opening. The tapered portion 816 may also be configured to apply more force to predetermined edges. For example, a slope of the tapered portion 816 may be varied around the punch 800 for the openings. For example, the tapered portion 816 may be configured to apply a greater amount of plastic deformation to the bridge region 146 and/or the outer bridge regions 148.

The laminations be assembled after the punching process. Prior to assembly, an insulation coating may be applied to each of the laminations. The insulation coating may be applied to the deformed regions in which previously deposited insulation may have been removed during the deforming process.

Figure 17:
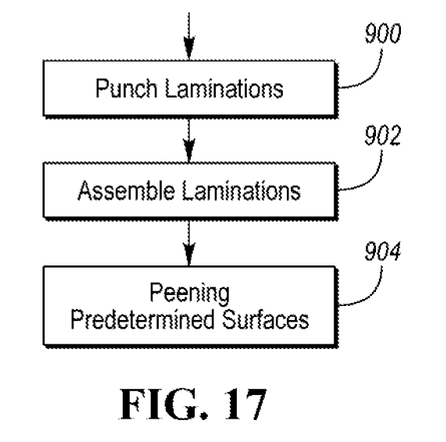
FIG. 17 depicts a sequence of operations for reducing core losses in an electric machine.

FIG. 17 depicts an example process flow for a method of reducing core losses in an electrical device. At operation 900, core laminations are formed by punching a sheet of electrical steel resulting in one or more cut edges. At operation 902, the laminations may be assembled into a core such that an outer perimeter surface of the core is defined by the cut edges. At operation 904, the predetermined surfaces may be peened by the techniques that have been previously described. For example, the predetermined surfaces may include the outer perimeter surface of the core, the inner perimeter surface, and/or openings formed in the core (e.g., magnet openings).

Figure 18:
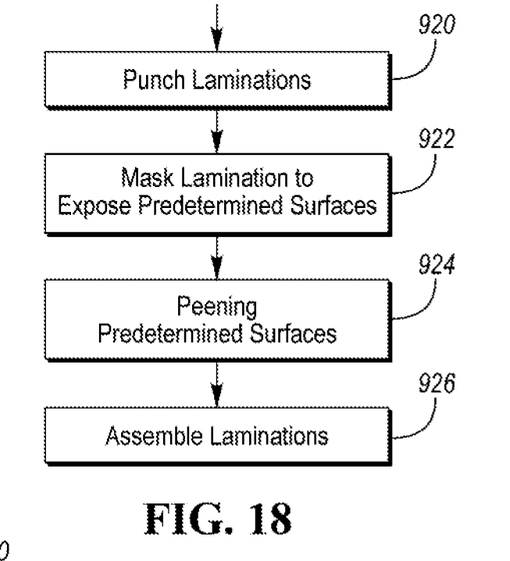
FIG. 18 depicts a sequence of operations for processing laminations to improve operating characteristics.

FIG. 18 describes an example process flow for processing electrical device core laminations prior to assembly. At operation 920, core laminations are formed by punching a sheet of electrical steel resulting in one or more cut edges. At operation 922, a mask is placed over the lamination to expose predetermined surface areas of the lamination. For example, the mask may be configured to expose a surface immediately adjacent to an outer perimeter edge defined by the cut edges. At operation, 924, the exposed surfaces of the lamination are peened (e.g., by shot peening). The process may be repeated on both sides of the lamination, simultaneously or as an additional operation. At operation 924, the laminations may be assembled into a core. The resulting changes in core properties may depend on the predetermined surface areas that are peened. For example, peening some selected surface areas may result in reduced core losses, while peening other selected surface areas may result in increased magnetic permeability.

Figure 19:
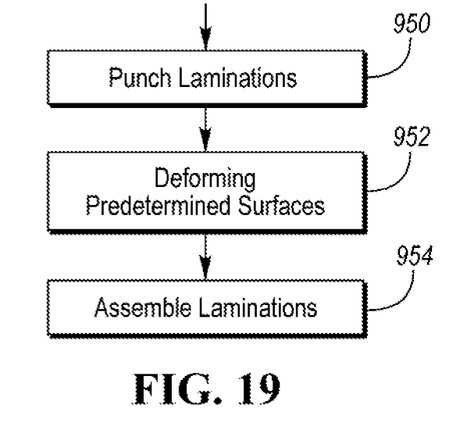
FIG. 19 depicts a sequence of operations for reducing magnetic permeability is specified areas.

FIG. 19 describes an example sequence for processing an electrical core to change magnetic permeability. At operation 950, core laminations are formed by punching a sheet of electrical steel to define a final shape of the core. At operation 952, predetermined surfaces of the lamination are deformed. For example, deforming of the predetermined surfaces of the lamination may be performed using a press machine configured with a mold to form one or more indentations in the predetermined surface regions. As an example, for a rotor lamination, the predetermined surfaces may include the surface located between magnet openings at the base of the V-shaped magnet openings at which the associated magnet openings are closest. At operation 954, the laminations may be assembled into the electrical core.

Although the description is applied to electric machines in a vehicle application, the methods described are applicable electrical devices used in any field of application. The methods are applicable to inductor and transformer cores as well. The methods described are applicable for tuning the magnetic properties of electrical device cores. By selection of the regions to be treated by peening or deformation, magnetic permeability and/or core losses may be modified. The method to be utilized may depend upon the tuning result desired, reduced core losses or decreased magnetic permeability.

The methods disclosed are beneficial in that properties of the electric machine may be tailored to satisfy operation targets. The methods can be used to reduce core losses in the electric machine. The methods can also reduce magnetic permeability in selected regions of the core to further tune operating characteristics of the electric machine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for reducing core loss in an electrical device core comprising:
    punching a plurality of laminations from one or more electrical steel sheets that results in one or more cut edges;
    assembling the laminations into the electrical device core such that an outer perimeter surface of the electrical device core is defined by the cut edges; and
    peening the outer perimeter surface to remove residual stresses.

2. The method of claim 1 further comprising peening an inner perimeter surface that is further defined by the cut edges to remove residual stresses.

3. The method of claim 2 wherein the inner perimeter surface defines a plurality of slots and further comprising peening the slots to remove residual stresses.

4. The method of claim 1 further comprising peening magnet opening surfaces that are further defined by the cut edges to remove residual stresses.

5. The method of claim 1 wherein the peening is performed by one or more of shot peening, wet shot peening, cavitation peening and laser peening.

6. A method for reducing core loss in a rotor core comprising:
    punching a plurality of laminations from one or more electrical steel sheets that results in one or more cut edges;
    assembling the laminations into a rotor core having an outer perimeter surface defined by the cut edges and having opposing end faces; and
    peening the outer perimeter surface to produce indentations on the outer perimeter surface and remove residual stresses.

7. The method of claim 6 further comprising peening an inner perimeter surface that is further defined by the cut edges to remove residual stresses.

8. The method of claim 7 wherein the inner perimeter surface defines a plurality of slots and further comprising peening the slots to remove residual stresses.

9. The method of claim 6 further comprising peening magnet opening surfaces that are further defined by the cut edges to remove residual stresses.

\* \* \* \* \*